(12) United States Patent
Kruglick (10) Patent No.: US 8,643,625 B2
(45) Date of Patent: Feb. 4, 2014

(54) COMMUNICATION BETWEEN TOUCH-PANEL DEVICES

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 126 days.

(21) Appl. No.: 13/142,093

(22) PCT Filed: Jun. 10, 2010

(86) PCT No.: PCT/US2010/038150
§ 371 (c)(1),
(2), (4) Date: Jun. 24, 2011

(87) PCT Pub. No.: WO2011/155939
PCT Pub. Date: Dec. 15, 2011

(65) Prior Publication Data
US 2011/0304583 A1 Dec. 15, 2011

(51) Int. Cl.
*G06F 3/044* (2006.01)
(52) U.S. Cl.
USPC .............. 345/174; 345/1.1; 345/1.2; 345/1.3; 345/2.1; 345/2.3; 345/173; 345/175; 345/176; 345/177; 345/178; 455/95; 455/436; 455/517
(58) Field of Classification Search
USPC ........ 345/1.1–1.3, 2.1, 2.3, 173–178; 455/95, 455/517, 436
See application file for complete search history.

(56) References Cited

U.S. PATENT DOCUMENTS

| | | | |
|---|---|---|---|
| 2005/0230609 A1 * | 10/2005 | Randall | 250/234 |
| 2007/0057790 A1 | 3/2007 | Alden et al. | |
| 2007/0177554 A1 | 8/2007 | Yang et al. | |
| 2007/0287386 A1 | 12/2007 | Agrawal et al. | |
| 2008/0122792 A1 | 5/2008 | Izadi et al. | |
| 2009/0193143 A1 | 7/2009 | Karaoguz et al. | |
| 2009/0247187 A1 | 10/2009 | Feher | |

FOREIGN PATENT DOCUMENTS

| | | |
|---|---|---|
| JP | 2004127173 A | 4/2004 |
| JP | 2009224840 A | 10/2009 |
| JP | 2010074701 A | 4/2010 |

OTHER PUBLICATIONS

"Touchscreen," Wikipedia, downloaded Sep. 14, 2010 from http://en.wikipedia.org/wiki/Touchscreen, 9 pages.

(Continued)

*Primary Examiner* — Joseph Haley
*Assistant Examiner* — Linh N Hoffner
(74) *Attorney, Agent, or Firm* — Hope Baldauff, LLC (57) ABSTRACT

Technologies described herein generally relate to communications between electronic systems. Each electronic system includes a touch-panel device that may be positioned in proximity to one another such that the near field emissions of the touch-panel devices interact with one another. The touch-panel devices can be adapted to sense one another based on these near field emissions. Once detected, the touch-panel devices can be configured to establish a communication channel to communicate information between one another via modulated near field emissions. Such exchanged information may include identification information, network addresses, security keys, and so forth. The exchanged information may be used for discovery or pairing between the touch-panel devices. The technology presented herein can support an intuitive user experience and improved security over traditional wireless pairing approaches.

20 Claims, 7 Drawing Sheets

(56) References Cited

OTHER PUBLICATIONS

"Projected Capacitive Touch Technology: For Outdoor and Through-Glass Applications," Tyco Electronics, Data Sheet, downloaded Jun. 3, 2011 from http://media.elotouch.com/pdfs/datasheets/projected_capacitive_ds.pdf, 2 pages.

"Projected Capacitive2 Touch Technology: For Outdoor and Through-Glass Applications," Tyco Electronics, Data Sheet, downloaded Sep. 14, 2010 from http://media.elotouch.com/pdfs/datasheets/pcapacitive_ds_110417.pdf, 2 pages.

International Search Report dated May 6, 2011 in International Application No. PCT/US10/38150.

Japanese Official Action dated Nov. 14, 2013 in Japanese Application No. 2012-554978.

* cited by examiner

700 A COMPUTER PROGRAM PRODUCT

702 A SIGNAL BEARING MEDIUM

704 AT LEAST ONE OF
- ONE OR MORE INSTRUCTIONS FOR GENERATING A FIRST SIGNAL MODULATED TO ENCODE INFORMATION;
- ONE OR MORE INSTRUCTIONS FOR COUPLING THE FIRST SIGNAL ONTO TO A FIRST ELECTRODE OF THE FIRST TOUCH-PANEL DEVICE;
- ONE OR MORE INSTRUCTIONS FOR RECEIVING A SECOND SIGNAL FROM A SECOND ELECTRODE OF THE FIRST TOUCH-PANEL DEVICE, WHEREIN THE SECOND SIGNAL IS INFLUENCED BY AN ELECTRIC FIELD ASSOCIATED WITH THE SECOND TOUCH-PANEL DEVICE; OR
- ONE OR MORE INSTRUCTIONS FOR ESTABLISHING A COMMUNICATIONS CHANNEL BETWEEN A FIRST ELECTRONIC SYSTEM ASSOCIATED WITH THE FIRST TOUCH-PANEL DEVICE AND A SECOND ELECTRONIC SYSTEM ASSOCIATED WITH THE SECOND TOUCH-PANEL DEVICE WHEREIN THE COMMUNICATIONS CHANNEL USES THE FIRST SIGNAL AND THE SECOND SIGNAL.

| A COMPUTER-READABLE MEDIUM 706 | A RECORDABLE MEDIUM 708 | A COMMUNICATIONS MEDIUM 710 |

*FIG. 7*

COMMUNICATION BETWEEN TOUCH-PANEL DEVICES

BACKGROUND

Unless otherwise indicated herein, the materials described in this section are not prior art to the claims in this application and are not admitted to be prior art by inclusion in this section.

Communication between electronic devices may be established for many applications. Such communication may include, or begin with, pairing two electronic devices together as participants in a communications channel. For wired channels, pairing may be explicitly initiated by directly coupling the electronic devices together with an interconnect mechanism such as a cable. For wireless channels, pairing may either be automatically initiated or manually initiated. Automatic pairing of electronic devices through a wireless channel lacks positive visual confirmation to a user and thus may be insecure and susceptible to various known exploits such as a "man in the middle" attack. Manual pairing may be established by the manual entry of an address, name, key, or identification code. Manual entry is time consuming, error prone, and not particularly user friendly.

In an example pairing application, a user may walk up to a kiosk, automated teller machine (ATM), or other host system and wish to use a mobile telephone, personal digital assistant (PDA), or other portable electronic device to communicate with the host system. The user may wish to establish communications between the mobile device and the host device for identification, transactions, file transfers, or other purposes.

SUMMARY

The present disclosure describes various techniques related to touch-panel devices. Some example touch-panel devices described herein include a processor and a controller. The controller is coupled to the processor and includes a detection circuit. The controller is configured to include a detection circuit coupled to the detect electrode. The controller is configured to receive a first signal from the detect electrode with the detection circuit. The controller is also configured to detect a modulation in the received first signal. The controller is further configured to determine information associated with the detected modulation. The detected modulation in the first signal may be indicative of a physical proximity between the touch-panel device and another touch-panel device.

The present disclosure also describes a computer storage medium that includes computer-executable instructions stored thereon for a method which, when executed by a computing device, adapt the computing device to establish communications utilizing a touch-panel device. According to some example methods described herein, information in a first signal is modulated. The first signal is coupled to a drive electrode of the touch-panel device such that the drive electrode generates a first electromagnetic field in response to the first signal. A second signal is received from a detect electrode of the touch-panel device. The second signal may be responsive to a second electromagnetic field associated with another touch-panel device. A communications channel is established between the touch-panel device and the other touch-panel device using the first signal and the second signal.

The present disclosure also describes various techniques for a computer-implemented method for communicating between a first touch-panel device and a second touch-panel device. According to some example methods, the first touch-panel device is configured to receive a first signal from a first electrode of the first touch-panel device. The first touch-panel device is also configured to detect a modulation in the first signal. The modulation may indicate a communication from the second touch-panel device. The first touch-panel device is further configured to determining information associated with the modulation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and arc, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein.

This disclosure is generally drawn, inter alia, to methods, apparatus, systems, and computer program products related to communications between touch-panel devices, such as touch-screen devices and/or non-screen touch-panel devices. Although some embodiments described herein may refer to touch-screen devices, it should be appreciated that these embodiments may be similarly implemented on non-screen touch-panel devices. The communications may be established using interactions between the electromagnetic fields of two touch-panels positioned in close proximity to one another. The touch-panels may be touch sensitive display components of any type of electronic device or system. For example, each of the touch-panels may be part of a PDA, mobile phone, smart phone, laptop, netbook, tablet, gaming device, electronic book, computer, television, kiosk, ATM, digital photograph frame, point of sales terminal, digital map, or any other electronic device. It should be appreciated that one, or both, of the communicating touch-panels may be mobile devices or stationary devices.

Briefly stated, technologies described herein generally relate to communications between electronic systems. Each electronic system includes a touch-screen device that may be positioned in proximity to one another such that their near field emissions of the touch-screen devices interact with one another. The touch-screen devices can be adapted to sense one another based on these near field emissions. Once detected, the touch-screen devices can be configured to establish a communication channel to communicate information between one another via modulated near field emissions. Such exchanged information may include identification information, network addresses, security keys, and so forth. The exchanged information may be used for discovery or pairing between the touch-screen devices. The technology presented herein can support an intuitive user experience and improved security over traditional wireless pairing approaches.

Figure 1:
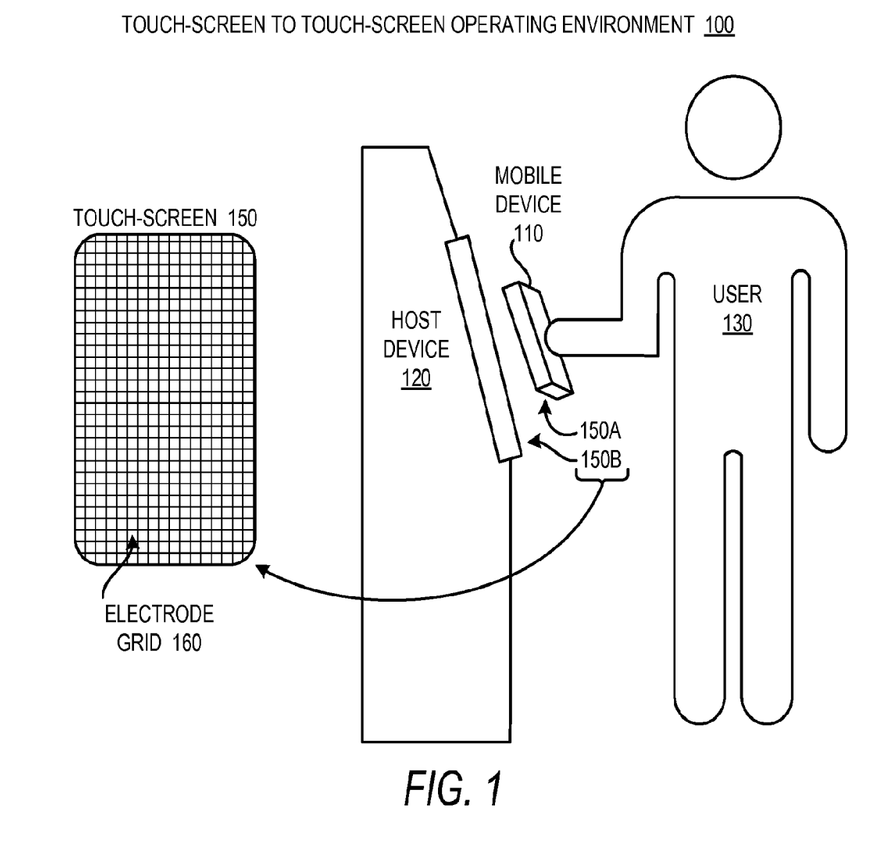
FIG. 1 is a block diagram illustrating an example touch-screen to touch-screen operating environment.

FIG. 1 is a block diagram illustrating an example touch-screen to touch-screen operating environment 100, arranged according to one or more embodiments presented herein. As illustrated, a user 130 can position a mobile device 110 adjacent or proximate to a host device 120, where the mobile device 110 includes a touch-screen 150A and the host device 120 also includes a touch-screen 150B. The touch-screens 150A-150B may be referred to generically, or collectively, as touch-screens 150. Each of touch-screens 150 may include an electrode grid 160. The relative positioning of the mobile device 110 and the host device 120 by the user 130 can bring the two touch-screens 150 into a physical proximity to one another such that electromagnetic fields associated with the electrode grids 160 within the two touch-screens 150 may interact. The electromagnetic interaction between the touch-screens 150 can be utilized by one touch-screen 150 to detect the presence of the other touch-screen 150, and may also be utilized to support communication of information between the touch-screens 150.

Example touch-screens 150 may employ capacitive touch-screen technology such as projected capacitive touch (PCT) technology. PCT touch-screen technology may be used in many mobile phones, consumer appliances, desktop computers, service kiosks, and so forth. PCT technology can support multi-touch and can operate through protective screen layers. The electrode grid 160 within a PCT touch-screen includes a grid of capacitive electrodes. Electrical signals may be applied to the capacitive electrodes to generate short range electric fields between electrodes, which may act as individual plates of capacitors. In conventional operation as a touch detector, the electric fields may form between electrodes within the same electrode grid 160. However, the technology described in some embodiments herein can leverage interaction of these electric fields between the two touch-screens 150A and 150B.

Electrical signals may be applied to the capacitive electrodes to generate the electric fields. These electrical signals may be high frequency carrier signals. These carrier signals can couple between multiple electrodes within the electrode grid 160 of a device. A finger or conductive stylus can touch upon, or near, the surface of the touch-screen 150 thus distorting the electric fields coupled between the capacitors within the electrode grid 160 of the device. This distortion in the field can effectively change the capacitance at the distorted point in the electrode grid 160. These distortions can be affected through glass or other protective layers at a range of up to about a centimeter. Signal processing may be configured to detect the locations of the field distortions and the corresponding touch. The signal processing may also be configured to evaluate the distortion to determine if it is to be counted as a touch to the touch-screen 150. For example, the change in capacitance may be compared to an established threshold level for classification as a touch input.

The signal processing may be configured to measure the distortion in the field by applying an oscillatory voltage (e.g., at a crystal set frequency) between electrodes and measuring the resulting current or resulting voltage change at a current source. The signal processing may also be configured to identify a distortion representing a touch input when the resulting change is greater than an established threshold level. By evaluating the change in capacitance at multiple points of the touch-screen 150, the signal processing can detect touch inputs throughout the surface of the touch-screen 150. Additional processing may be utilized to determine which, if any, of the points are evaluated at a given instance. For example, if the touch-screen 150 is a mobile phone and the user 130 presses the touch-screen 150 against her ear and face during a phone call, the signal processing may decide not to evaluate the resulting distortion.

When two touch-screens 150A, 150B are positioned in near proximity to one another, their electromagnetic fields may interact with one another. This interaction is discussed in more detail with respect to FIG. 2. In typical touch detection operation, interaction between fields associated with two touch-screens 150 would be unexpected and likely confusing to the signal processing, which may be adapted to merely determine touch detection. However, the technology disclosed herein supports capturing and interpreting the interactions between the fields of the two touch-screens 150A, 150B as discussed in further detail with respect to FIG. 2.

According to one example application, the user 130 may have a mobile phone with a touch-screen 150A, where the mobile phone may serve as the mobile device 110. The user may approach a host device 120 with a larger display containing another touch-screen 150B. This host device 120 may be any appropriate device such as a computer terminal, a television, or a tablet computer. The user 130 can position the mobile phone adjacent or proximate to the host device 120 such that the fields of the two touch-screens 150A, 150B can interact. The host device 120 can be configured to transfer a network or display address to the mobile device 110 via the field interaction between the devices. The mobile device 110 may then use the received address to transfer its display output to the host device 120 such that the larger display may be used for presenting an image or video from the mobile device 110. Similarly, a video conference call may be transferred from the mobile device 110 to the host device 120 according to the transferred address. While the touch-screens 150 may be used to transfer the initial address between the mobile device 110 and the host device 120, a secondary channel such as a WiFi, WiMax, Bluetooth, Zigbee, EDGE, PCS, 3G, 4G, or Internet connection may be used for the transfer of higher bandwidth information.

According to a similar example application, security or encryption keys may be exchanged between the mobile device 110 and the host device 120 using a communication channel established between the two touch-screens 150. The exchanged security or encryption keys may then be used to secure future communications between the host device 120 and the mobile device 110. The future communications may be over a secondary channel, such as a wireless link. As such, a typical wireless channel that may lack a high level of security or certainty of pairing may be adapted to leverage the added security of the key exchange occurring through the interface between the touch-screens 150. While the host device 120 may be configured to detect the mobile device 110 in a pants pocket of the user 130 using a traditional wireless discovery protocol, there is little affirmative certainty that the correct wireless link has been made without the potential interference of another party. Using the technology disclosed herein, the user 130 has a high degree of certainty in a key exchanged or address provided by holding his mobile phone touch-screen 150A against the touch-screen 150B of the host device 120. This may be particularly advantageous in the case of financial transactions such as where the host device 120 may be an ATM or a point of sales terminal.

According to another example application, the mobile device 110 may be configured to exchange information with the host device 120 in order to enable access from the mobile device 110 to a peripheral associated with the host device 120. For example, a kiosk or computer at a printing shop or drug-store may serve as the host device 120 while the mobile device 110 may be a camera phone, digital camera, PDA, computer, or any other device containing or having access to photographs. Once the mobile device 110 is paired with the host device 120 using the touch-screen to touch-screen communications channel, photographs may be transferred from the mobile device 110 to the host device 120 in order for the photographs to be printed or otherwise processed by the host device 120. While the peripheral in this above described example is a photo printing system associated with the host device 120, it should be appreciated that the technology disclosed herein may support peripherals associated with either the host device 120 or the mobile device 110. Furthermore, the supported peripherals may be communication devices, displays, printers, storage systems, scanners, manufacturing equipment, security devices, door locks, vending systems, media delivery systems, or any other peripherals that may be adapted to utilize a communication link between the host device 120 and the mobile device 110.

According to various other example applications, the mobile device 110 and the host device 120 may exchange keys, secrets, passwords, addresses, and so forth. This information may be used for encryption, identification, authentication, non-repudiation, key generation, and various other communication applications. The affirmative coupling of information between the mobile device 110 and the host device 120 can support pairing, or discovery, between the two devices. The touch-screen 150 communication based pairing disclosed herein can support reduced complexity when compared to manually entering keys, codes, or other identifiers. The touch-screen 150 communication based pairing disclosed herein can also support an improved sense of security and certainty for a user that the two devices that were touched together are now the ones that are communicating with vastly reduced risk of attack from a man-in-middle participant in the communications channel.

It should be appreciated that while the two devices used in the touch-screen 150 communications channel are described as being a mobile device 110 and a host device 120, the two devices may be both be mobile device or stationary. For example, one mobile phone touch-screen 150 may configured to communicate to another mobile phone touch-screen 150 using the technology discussed herein to exchange information, keys, files, applications, etc. The communications may also be between a mobile phone device and a tablet or laptop device, between a PDA device and a television device, or generally between any two devices having touch-screens 150.

Figure 2:
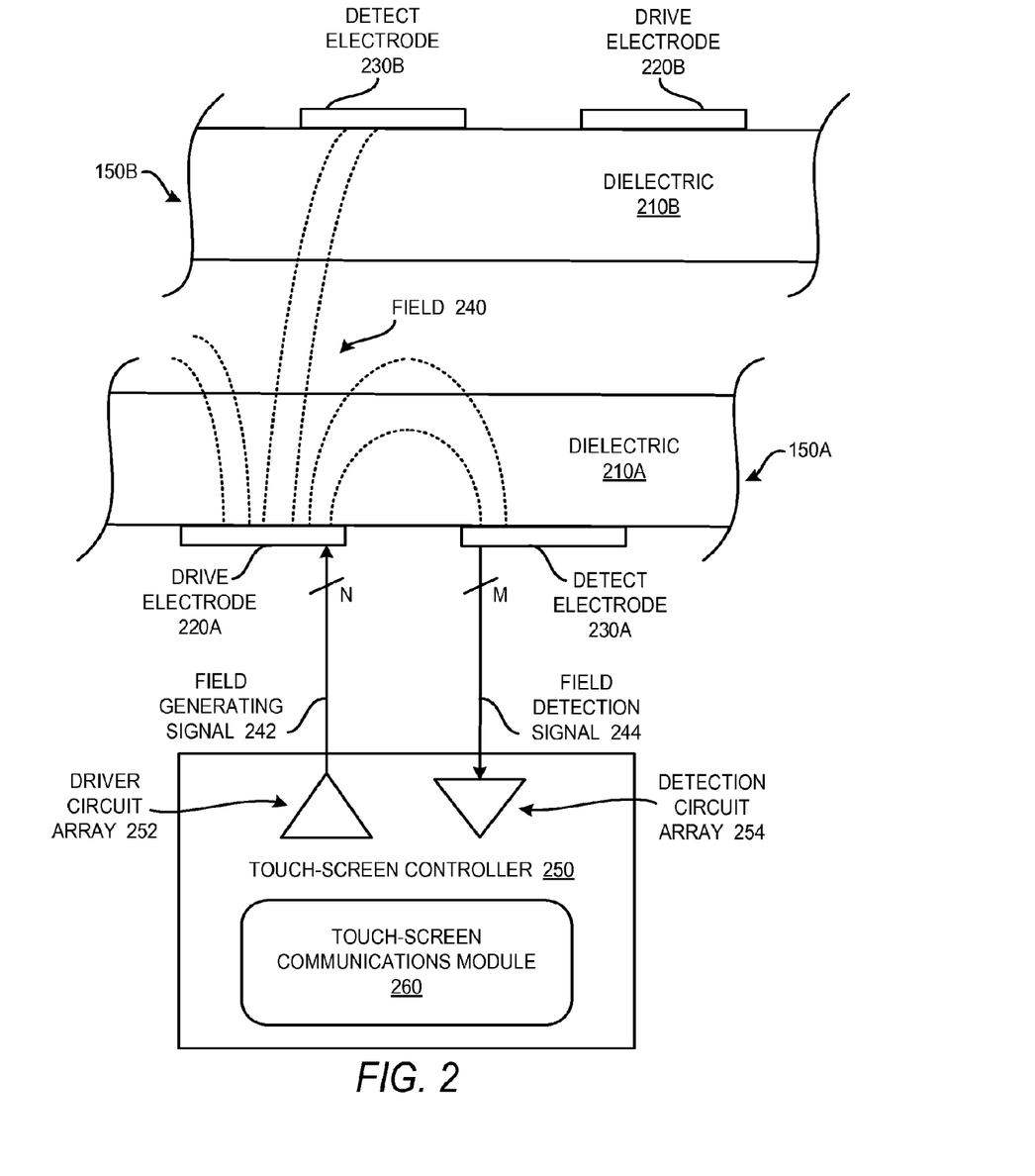
FIG. 2 is a schematic diagram illustrating an example electromagnetic field coupling between two touch-screens.

Turning now to FIG. 2, a schematic diagram illustrates an example electromagnetic coupling field 240 coupling between two touch-screens 150A, 150B, arranged according to one or more embodiments presented herein. A first touch-screen 150A includes a drive electrode 220A and a detect electrode 230A. The drive electrode 220A and detect electrode 230A may be part of the electrode grid 160 associated with the first touch-screen 150A. The first touch-screen 150A also includes a dielectric 210A which may be the protective glass outer surface of the touch-screen 150A. A second touch-screen 150B includes a drive electrode 220B and a detect electrode 230B. The drive electrode 220B and detect electrode 230B may be part of the electrode grid 160 associated with the second touch-screen 150B. The second touch-screen 150B also includes a dielectric 210B which may be the protective glass outer surface of the touch-screen 150A. The dielectrics 210A, 210B may be made of glass, plastic, polymer, acrylic, or any other optically transparent or translucent dielectric material. In some other embodiments, the dielectric material may not be optically transparent or translucent. For example, some other touch-panels, such as a touchpad, may utilize an opaque, non-screen material.

In some examples, the first touch-screen 150A can be configured to operate as a touch detector, where a coupling field 240 is generated between the drive electrode 220A and the detect electrode 230A. As such, a capacitor is formed with the drive electrode 220A and the detect electrode 230A serving as the plates of the capacitor with the coupling field 240 in between the capacitor plates. In this role of touch detection, the coupling field 240 may be distorted by the introduction of a finger or stylus on, or near, the dielectric 210A. The introduction of the finger or stylus into the field can distort the field by modifying the capacitance or conductivity between the drive electrode 220A and the detect electrode 230A. A sensor (not shown) may be configured to measure the capacitance and detect changes in capacitance.

When the first touch-screen 150A and the second touch-screen 150B are brought into proximity with one another to establish communications, the coupling field 240 originally associated with the first touch-screen 150A may influence the detect electrode 230B of the second touch-screen 150B. Similarly, another field (not illustrated) originally associated with the second touch-screen 150B may influence the detect electrode 230A of the first touch-screen 150A. The distance between the first touch-screen 150A and the second touch-screen 150B while they are in communicating proximity may be on the scale of millimeters up to approximately one centimeter. Depending upon the nature of the associated electronics and the electrode grid 160, the maximum distance for communication between touch-screens 150 may be more or less than one centimeter.

A touch-screen controller 250 can comprise a driver circuit array 252. Each one of a quantity of N drivers within the driver circuit array 252 can be configured to generate and drive a field generating signal 242 into one of the drive electrodes 220A. The touch-screen controller 250 can also comprise a detection circuit array 254. Each one of a quantity of M detectors within the detection circuit array 254 can be configured to receive and process a field detection signal 244 received from one of the detect electrodes 230A. The touch-screen controller 250, the driver circuit array 252, and the detection circuit array 254 may include one or more electronic components and/or some combination of electronic components and software components or modules. It should be appreciated that the touch-screen controller 250 is associated with the first touch-screen 150A and that another touch-screen controller (not illustrated) may be associated with the second touch-screen 150B.

The touch-screen controller 250 can be configured to detect any distortions in the coupling field 240 along with the distortion positions by processing the field detection signal 244 received from the detect electrode 230A. Such processing can include analyzing the field detection signal 244 to determine changes in the signal (e.g., changes in signal amplitude, frequency, phase, polarity, pulse-width, etc.) possibly caused when a user alters the capacitance or conductivity within the electrode grid 160. From this, positions of touches to the touch-screen 150A may be identified and located by the touch-screen controller 250.

A touch-screen communications module 260 can be adapted to support communications between the touch-screens 150. For example, the touch-screen communications module 260 can be configured to modulate the field generating signal 242, such as a series of drive pulses as detailed in FIG. 3. The field generating signal 242 may also be multiplied or otherwise mixed into a given carrier frequency (e.g., 50 kHz). The field generated by the modulated signal can be coupled to the detect electrode 230B of the second touch-screen 150B through the coupling field 240. Detection of this modulated field at the second touch-screen 150B can thus be utilized to communicate information from the first touch-screen 150A to the second touch-screen 150B by encoding the information within the signal modulation. The information may be conveyed at rates on the order of thousands of symbols per second. Each symbol may correspond to any appropriate number of data bits (e.g., 0.5 bit/symbol, 1 bit/symbol, 1.5 bits/symbol, 2 bits/symbol, etc.). According to various embodiments, many other data rates, either faster or slower than thousands of symbols per second, may be achieved. The modulation may involve pulse amplitude coding, pulse width coding, pulse frequency coding, pulse duty cycle coding, amplitude coding, frequency coding, phase coding, any other type of modulation, or any combination thereof.

The communication between the touch-screens 150A, 150B may include discovery or detection for pairing. According to some embodiments, a beacon signal, such as a specific modulation or specific frequency of pulses, may be used to generate the coupling field 240 associated with a touch-screen 150. Another touch-screen may then detect this beacon modulation in the field 140 and respond with an acknowledgement signal in its own generated field. From this initial discovery or handshake, communications may be established between the two touch-screens 150.

According to some embodiments, a touch-screen 150 may be configured to monitor the detected signal for high component frequencies. Such high frequency fluctuations may be too rapid to have been generated by human activity and thus may be an indication that another touch-screen 150 in proximity is attempting to communicate. As discussed in further detail in FIG. 3, a high frequency beacon signal can be encoded into modulated information as an identifier in the drive signal used for touch detection. Thus, the touch-screens 150 could pair at any time even while the touch detection functionality is operating. Alternatively, the touch-screens 150 may attempt to detect the beacon signal whenever it is not engaged in touch detection.

Touch-screen hardware such as that based on PCT can support screen-to-screen communications with the addition of a touch-screen communications module 260 to generate and detect modulating signals. According to some embodiments, the addition of the touch-screen communications module 260 may be performed through a software or firmware update to the touch-screen controller 250. It should be appreciated that the concepts presented herein may be extended to touch-screen technologies other than PCT. Any touch-screen technology that generates a near field signal may be a candidate for screen-to-screen communications.

According to some embodiments, internal reflection touch-screen devices may support screen-to-screen communications. Even though such devices generally do not have a signal or field that emits beyond the surface of the touch-screen, they may still be utilized to establish communications where there is light leakage from one device to another or where a semitransparent object between the screens can couple light from one screen to another.

Figure 3:
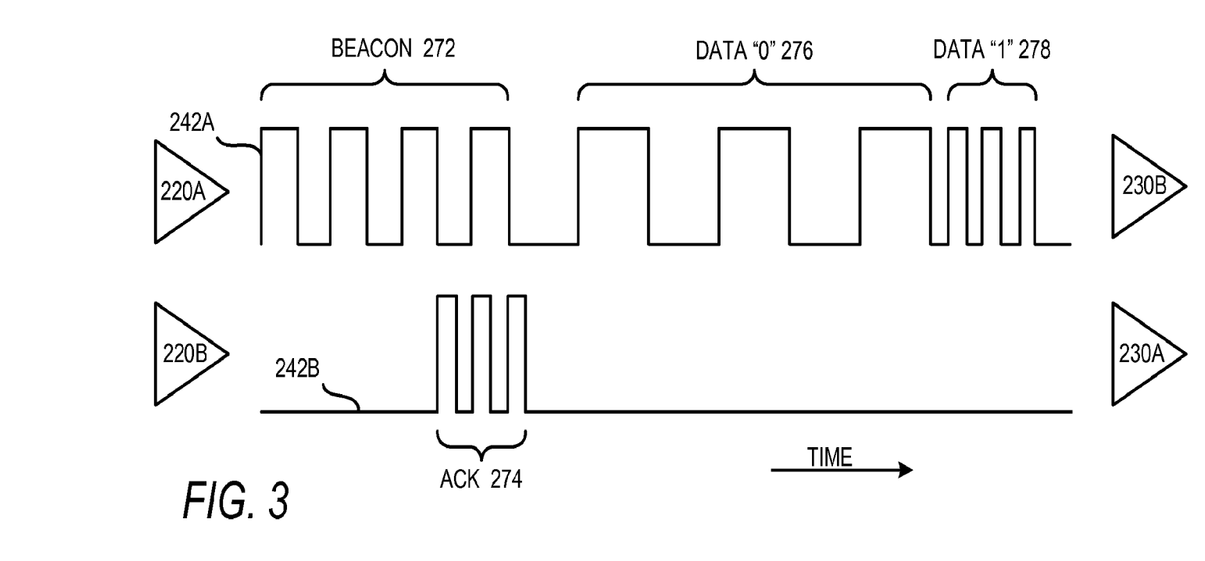
FIG. 3 is a signal timing diagram illustrating an example exchange between two touch-screens.

Turning now to FIG. 3, a signal timing diagram illustrates an example exchange between two touch-screens, arranged according to one or more embodiments presented herein. The touch-screen communications module 260 may generate, via the driver circuit array 252, a field generating signal 242A at the first touch-screen 150A and driven onto the drive electrode 220A. A coupling field 240 can then radiate from the drive electrode 220A to be received at the detect electrode 230B associated with the second touch-screen 150B. The coupling field 240 may form a communication channel. A return path of this communication channel may be established from the second touch-screen 150B to the first touch-screen 150A. A field generating signal 242B may be generated at the second touch-screen 150B and driven onto the drive electrode 220B. A coupling field 240 can then radiate from the drive electrode 220B to be received at the detect electrode 230A associated with the first touch-screen 150A.

The example illustrated in FIG. 3 utilizes a pulse width coding. It should be appreciated that any other modulation or coding scheme may be utilized to establish screen-to-screen communications according to various embodiments and of the technology discussed herein.

Prior to pairing between the first touch-screen 150A and the second touch-screen 150B, the first touch-screen 150A may encode, via the driver circuit array 252, a signal representing a beacon 272. After detection of the beacon 272 by the second touch-screen 150B, the second touch-screen 150B may encode an acknowledgment 274 to signal that the second touch-screen 150B has detected the beacon 272. Upon receiving the acknowledgment 274 from the second touch-screen 150B, the first touch-screen 150A may begin to encode, via the driver circuit array 252, information within data bits. In the example illustrated, the first touch-screen 150A encodes a first symbol 276 corresponding to a data value of "0" followed by a second symbol 278 corresponding to a data value of "1". Other sequences of symbols, encodings, and/or modulation schemes may be utilized to represent the information for transmission between the touch-screens 150.

A suitable data framing protocol may be implemented in order to determine when data starts and ends and/or a number of symbols that will be transmitted. The data framing protocol may be an asynchronous data framing protocol or a synchronous data framing protocol. The data framing protocol may also add parity bits or checksums for error detection. Examples of data transmission protocols may include User Datagram Protocol (UDP), Transmission Control Protocol (TCP), or Teletypewriter Protocol (TTY).

Figure 4:
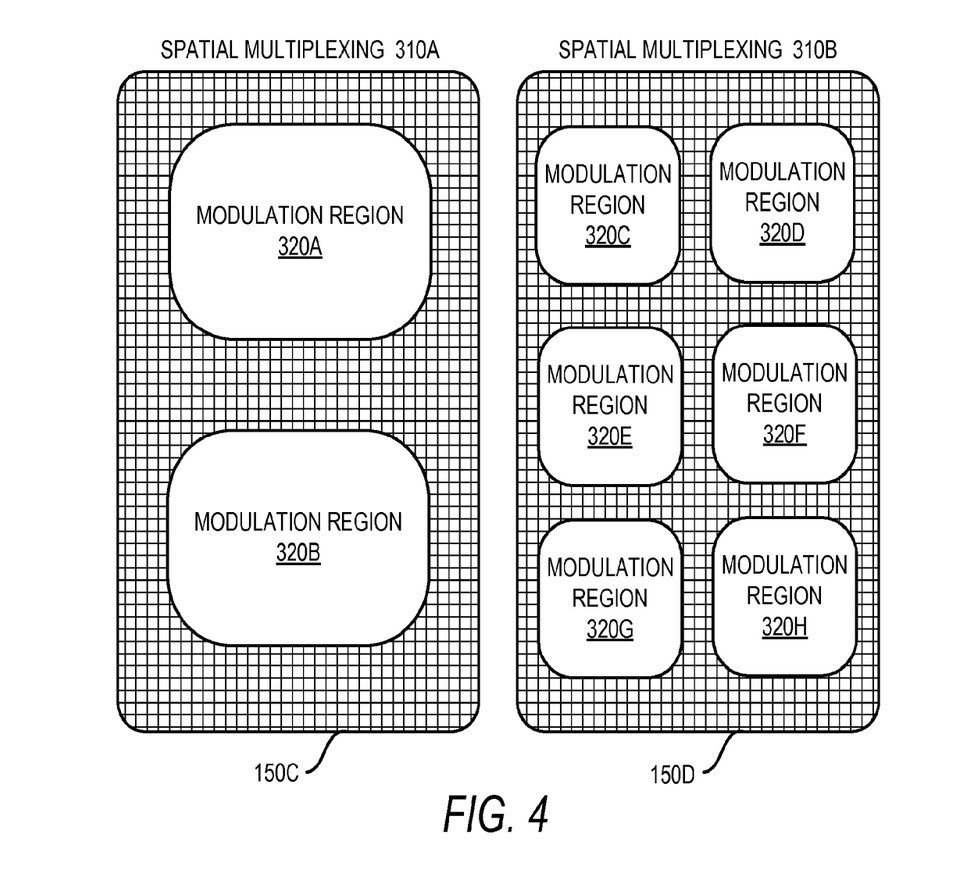
FIG. 4 is a schematic diagram illustrating example mappings for spatial multiplexing of touch-screen communications.

Turning now to FIG. 4, a schematic diagram illustrates example mappings for spatial multiplexing 310A, 310B of touch-screen communications, arranged according to one or more embodiments presented herein. In a spatial multiplexing, a separate communication channel may be established for different spatial regions of the display screen.

A first example mapping for spatial multiplexing 310A may involve two distinct modulation regions 320A, 320B. Specifying two distinct modulation regions 320A, 320B within the touch-screen 150C may be utilized to support two separate communication channels between touch-screens using the various communication technologies discussed herein. Simultaneously modulation in the two distinct modulation regions 320A, 320B may support twice as much information transmission per unit time when compared to using a single modulation region on the touch-screen 150C.

A second example mapping for spatial multiplexing 310B may involve six distinct modulation regions 320C-320H within the touch-screen 150D. The six distinct modulation regions 320C-320H may increase information transmission capacity by facilitating up to six distinct communication channels for screen-to-screen communications.

The described mappings for spatial multiplexing 310A, 310B may be considered constellations of spatial modulation. It should be appreciated that various other constellations may be used according to various embodiments. These other constellations may involve any number of modulation regions and may be arranged in any pattern across the area of the touch-screen 150. In some embodiments, a touch-screen may be configured to "listen" in one area through one modulation region and "talk" in another area through another modulation region. While the talking modulation region may be configured to transmit a communication signal, the listening modulation region may be configured to transmit a cancelling or blocking signal, such as an inverse signal of the communication signal. This cancelling or blocking signal may be configured to reduce the amount of the communication signal that bleeds from one modulation region to the other modulation region. For example, the modulation region 320A may be configured to listen, and the modulation region 320B may be configured to talk. In this case, the modulation region 320A may be configured to send a cancelling or blocking signal at least in the direction of the modulation region 320B.

Figure 5:
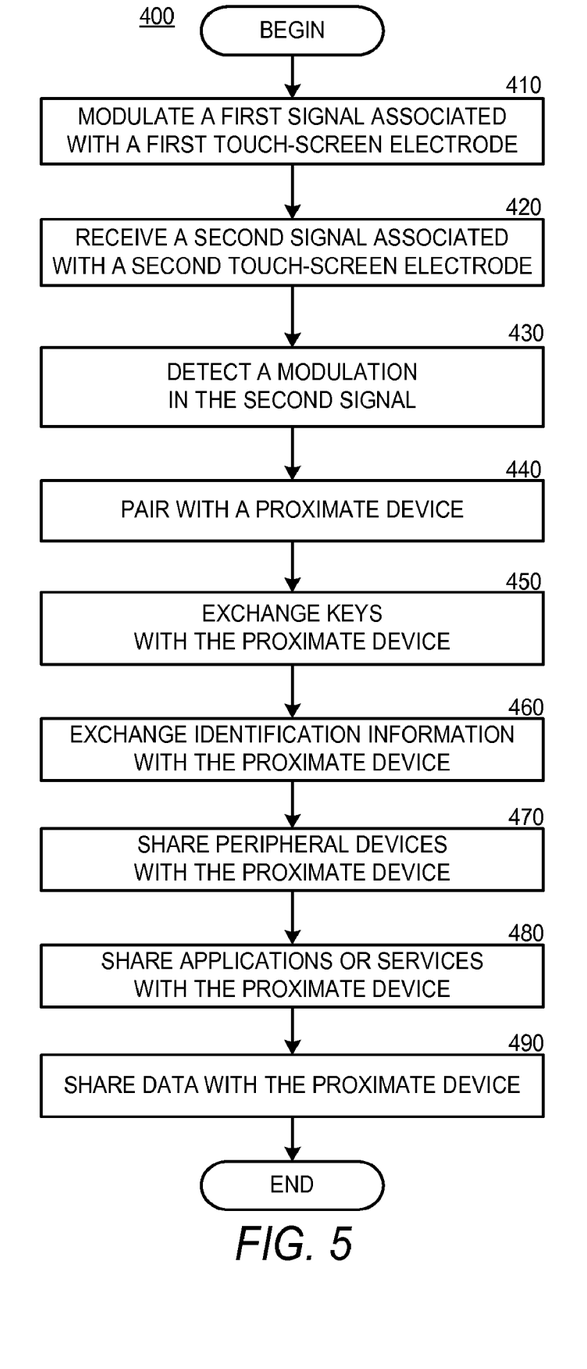
FIG. 5 is a flow diagram illustrating an example process for communicating between touch-screen devices.

Referring now to FIG. 5, additional details will be provided regarding the embodiments presented herein for screen-to-screen discovery, pairing, and communications. In particular, FIG. 5 is a flow diagram illustrating an example process 400 for communicating between touch-screen devices according to at least some embodiments presented herein. Process 400 may include one or more operations, functions or actions as illustrated by one or more of blocks 410, 420, 430, 440, 450, 460, 470, 480 and/or 490.

It should be appreciated that the blocks described herein may be implemented as a sequence of computer implemented instructions or program modules running on a computing system, as interconnected machine logic circuits or circuit modules within the computing system, or some combination thereof. The implementation is a matter of choice dependent on the performance and other requirements of the various embodiments. Some of the logical operations described herein are referred to variously as state operations, functions, structural devices, actions, or modules. These operations, functions, structural devices, actions and modules may be implemented in software, in firmware, in special purpose digital logic, and any combination thereof. It should also be appreciated that in some implementations one or more of the illustrated blocks may be eliminated, combined or separated into additional blocks than those shown in the figures and described herein. These blocks may also be performed sequentially, in parallel, or in a different order than those described herein.

The process 400 may begin at block 410 (modulate a first signal associated with a first touch-screen electrode). Block 410 may be followed by block 420 (receive a second signal associated with a second touch-screen electrode). Block 420 may be followed by block 430 (detect a modulation in the second signal). Block 430 may be followed by block 440 (pair with a proximate device). Block 440 may be followed by block 450 (exchange keys with the proximate device). Block 450 may be followed by block 460 (exchange identification information with the proximate device). Block 460 may be followed by block 470 (share peripheral devices with the proximate device). Block 470 may be followed by block 480 (share applications or services with the proximate device). Block 480 may be followed by block 490 (share data with the proximate device). After block 490 processing may terminate. Further details about each block will be described below.

At block 410 (modulate a first signal associated with a first touch-screen electrode), the touch-screen communications module 260 can cause the touch-screen controller 250 to modulate a signal, such as a series of drive pulses, to be driven from touch-screen controller 250 to the drive electrode 220A. The modulation can encode a beacon signal to support identification by another touch-screen device. The modulation can be adapted to encode other information to be conveyed through a coupling field 240 to the other touch-screen device.

At block 420 (receive a second signal associated with a second touch-screen electrode), the touch-screen communications module 260 can receive a signal from the detect electrode 230A. While normally used for detecting touches to the touch-screen 150, the signal from the detect electrode 230A can also couple a modulated signal generated at another touch-screen 150 when the two touch-screens are brought into proximity and the other touch-screen 150 is driven by a signal as discussed with respect to block 410.

At block 430 (detect a modulation in the second signal), the touch-screen communications module 260 can be configured to perform signal processing operations on the signal received in association with block 420. The signal processing operations can detect a modulation within the signal en coding a beacon signal or other information being conveyed through a coupling field 240 from the other touch-screen device.

At block 440 (pair with a proximate device), the touch-screen communications module 260 can be configured to create a pairing with a proximate device in response to information within the modulation in the second signal received at block 420. The proximate device may be associated with the other touch-screen 150 generating the second signal modulation detected at block 430. Pairing information may be transmitted to the proximate device by modulating a signal driven to drive electrode 220A as discussed with respect to block 410. Similarly, pairing information may be received from the proximate device by receiving a signal from the detect electrode 230A as discussed with respect to block 420 and then detecting a modulation within the signal as discussed with respect to block 430. Pairing with the proximate device can be based upon the exchange of this pairing information. This pairing can establish a relationship between the two devices in response to their touch-screens 150 being placed in physical proximity to one another.

At block 450 (exchange keys with the proximate device), the touch-screen communications module 260 can exchange keys with the proximate device using the first signal and the second signal. Key information may be transmitted to the proximate device by modulating the first signal driven to drive electrode 220A as discussed with respect to block 410. Similarly, key information may be received from the proximate device by receiving the second signal from the detect electrode 230A as discussed with respect to block 420 and then detecting a modulation within the second signal as discussed with respect to block 430. The exchanged key information can be used to encrypt information exchanged through other communication channels with the added certainty that the keys were exchanged between the two devices when their touch-screens where physically touching, or at least within close proximity. The exchanged key information may also be used for secure authentication to confirm that a user of one of the devices is likely who they claim to be. The key information may also be used for non-repudiation or any other key-based security or data integrity application.

At block 460 (exchange identification information with the proximate device), the touch-screen communications module 260 can exchange identification information with the proximate device using the first signal and the second signal. Identification information may be transmitted to the proximate device by modulating the first signal driven to drive electrode 220A as discussed with respect to block 410. Similarly, identification information may be received from the proximate device by receiving the second signal from the detect electrode 230A as discussed with respect to block 420 and then detecting a modulation within the second signal as discussed with respect to block 430. The exchanged identification information may include addresses, identification codes, names, resource locators, and so forth. The identification information can be used to identify the two devices to one another and possibly support further communication through other channels with the added certainty that the communicating devices were identified to one another when their touch-screens where physically touching, or within close proximity.

At block 470 (share peripheral devices with the proximate device), the touch-screen communications module 260, or a higher level module associated therewith, can be configured to share peripheral devices with the proximate device in response to the pairing established in block 440. In some examples, the higher level module can be configured to operate at an application layer, while the communication protocols may be managed at a transport/communication layer. The supported peripherals may be communication devices, displays, printers, storage systems, scanners, manufacturing equipment, security devices, door locks, vending systems, media delivery systems, or any other peripherals benefiting from a communication link between the two devices. The information link, or links, supporting the sharing of peripheral devices may include the screen-to-screen communications channel or may include other communications channels. The other communications channels may be indicated or otherwise enabled by the pairing of block 440, the key exchange of block 450, the identification information exchange of block 460, or any combination thereof.

At block 480 (share applications or services with the proximate device), the touch-screen communications module 260, or a higher level module associated therewith, can be configured to share applications or services with the proximate device in response to the pairing established in block 440. The applications or services may include communication connections such as phone calls, video calls, or data services. The applications or services may also include computer programs, computer program modules, subscriptions, access rights, and so forth. The communication link, or links, supporting the sharing of applications or services may include the screen-to-screen communications channel or may include other communications channels. The other communications channels may be indicated or otherwise enabled by the pairing of block 440, the key exchange of block 450, the identification information exchange of block 460, or any combination thereof.

At block 490 (share data with the proximate device), the touch-screen communications module 260, or a higher level module associated therewith, can be configured to share data with the proximate device in response to the pairing established in block 440. The shared data may include media files, contact information, emails, documents, database entries, maps, internet address, computer program data, passwords, user names, telemetry, or another other data associated with either of the paired devices. The communication link, or links, supporting the sharing of data may include the screen-to-screen communications channel or may include other communications channels. The other communications channels may be indicated or otherwise enabled by the pairing of block 440, the key exchange of block 450, the identification information exchange of block 460, or any combination thereof.

Figure 6:
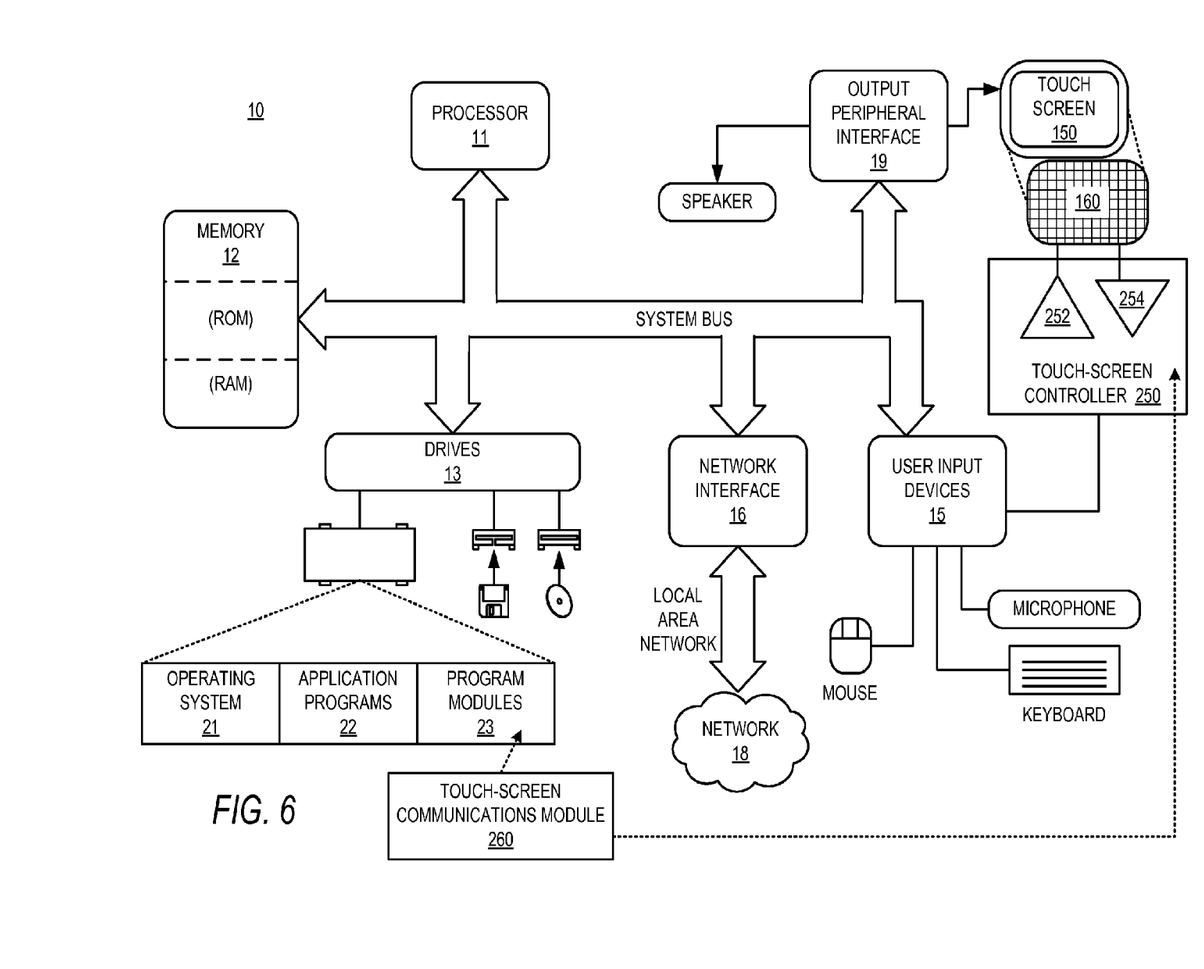
FIG. 6 is a block diagram illustrating an example computing device.

With reference to FIG. 6, an example computing device for implementing various embodiments presented herein will be discussed. The computing device 10 may include a processor 11, a memory 12 and one or more storage drives 13. The storage drives 13 and their associated computer storage media may provide storage of computer readable instructions, data structures, program modules 23 and other data for the computing device 10. The computing system may be adapted to support embodiments for implementing communications between touch-screen devices. For example, the computing system may comprise program modules 23 such as the touch-screen communications module 260 previously described herein. Various embodiments may include computers, dedicated hardware, or embedded computing systems.

The computing device 10 may be implemented as a conventional computer system, an embedded control computer, a laptop or a server computer, a mobile device, a set-top box, a kiosk, a vehicular information system, a mobile telephone, a customized machine, or some other hardware platform. The processor 11 may be a general purpose processor, a processor core, a multiprocessor, a multicore processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The processor 11 may support parallel dynamic optimization leveraging multicore processors as discussed herein.

The storage drives 13, other storage devices, or their associated computer-readable storage media may store an operating system 21, application programs 22, and program modules 23. The computing device 10 may include user input devices 15 through which a user may enter commands and data. Input devices may include an electronic digitizer, a microphone, a keyboard, a pointing device, or any combination thereof. Examples of pointing devices may include a mouse, trackball, light pen, touch screen, or touch pad. Other input devices to the computing device 10 may include a joystick, game pad, satellite dish, scanner, or the like. Input devices may be coupled to processor 11 through a user input interface that is coupled to a system bus. The input devices may also be coupled by other interface and bus structures, such as a parallel port, game port or a universal serial bus (USB). Computers such as computing device 10 may also include other peripheral output devices such as speakers, which may be coupled through an output peripheral interface 19 or similar interface.

The output peripheral interface 19 can drive a display associated with the touch-screen 150. The touch-screen controller 250 can interface through the driver circuit array 252 and the detection circuit array 254 to the electrode grid 160 associated with the touch-screen 150. The touch-screen controller 250 can operate as one of the user input devices 15. It should be appreciated that the touch-screen communications module 260 can operate as a portion of, or in association with, the program modules 23 and/or the touch-screen controller 250.

The computing device 10 may operate in a networked environment using logical connections to one or more computers, such as a remote computer coupled to network interface 16. The remote computer may be a personal computer, a server, a router, a network PC, a peer device, or other common network node. The remote computer may include many or all of the elements described herein relative to the computing device 10. Networking environments may include networks (WAN), local area networks (LAN), intranets, the Internet, or combinations thereof.

When used in a LAN or wireless LAN (WLAN) networking environment, the computing device 10 may be coupled to the LAN through a network interface 16 or a network adapter. When used in a WAN networking environment, the computing device 10 may include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computing device 10 may be configured such that the processor 11 and/or program modules 23 may perform communications between touch-screen devices in accordance with various embodiments presented herein. The computing device 10 may include one or more instances of a physical computer-readable storage medium or media associated with storage drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23 for performing communications between touch-screen devices. The program modules 23 may include software instructions that, when loaded into the processor 11 and executed, transform a general-purpose computing system into a special-purpose computing system customized to facilitate all, or part of, the touch-screen communication techniques disclosed herein. As detailed throughout this description, the program modules 23 may provide various tools or techniques by which the computing device 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support communications between touch-screen devices. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory 12, the program modules 23 may transform the physical state of the semiconductor-based memory 12 when the software is encoded therein. For example, the software may transform the state of transistors, capacitors, or other discrete circuit elements constituting the semiconductor-based memory 12.

As another example, the storage media may be implemented using magnetic or optical technology such as storage drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 7:
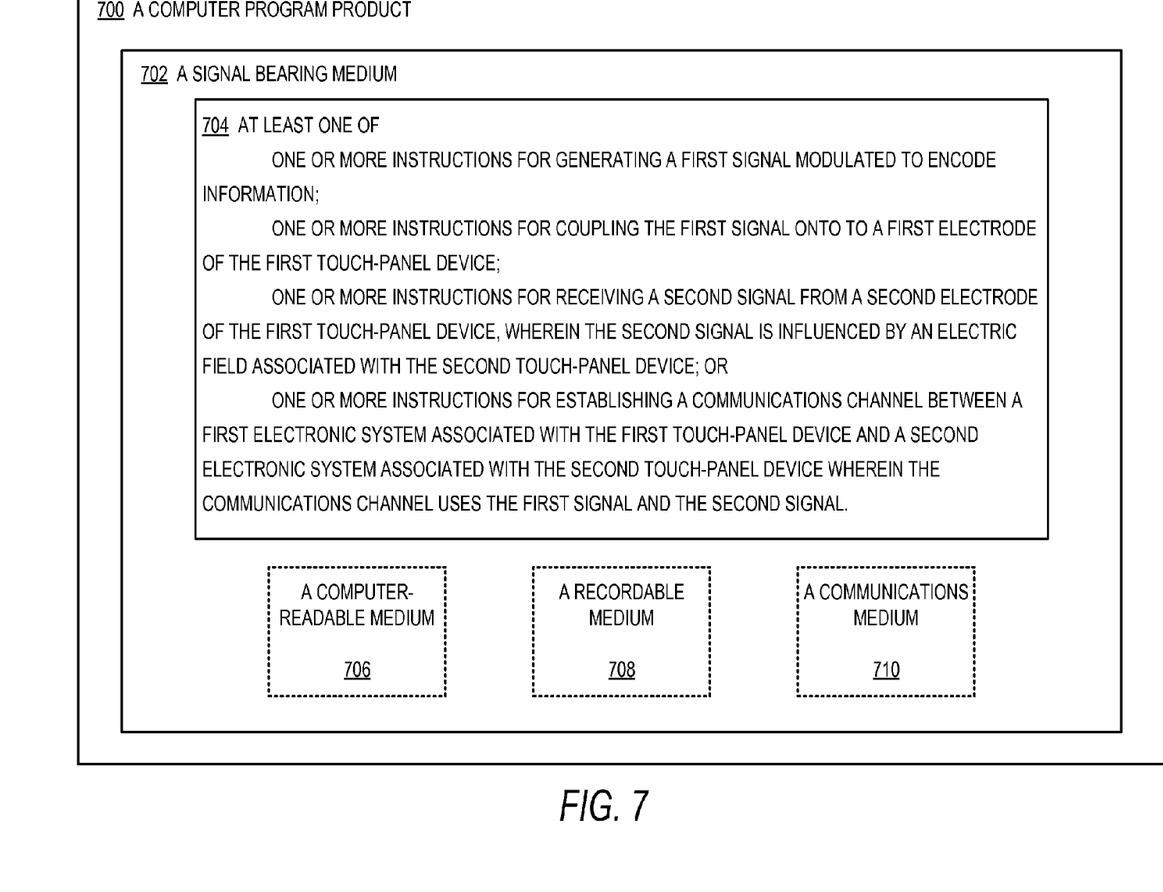
FIG. 7 is a schematic illustrating a partial view of an example computer program product that includes a computer program for executing a computer process on a computing device, all arranged according to at least some embodiments presented herein.

Turning now to FIG. 7, a schematic illustrates a partial view of an example computer program product 700 that includes a computer program for executing a computer process on a computing device, arranged according to at least some embodiments presented herein. An illustrative embodiment of the example computer program product is provided using a signal bearing medium 702, and may include at least one instruction of 704: one or more instructions for generating a first signal modulated to encode information; one or more instructions for coupling the first signal onto to a first electrode of the first touch-panel device; one or more instructions for receiving a second signal from a second electrode of the first touch-panel device, wherein the second signal is influenced by an electric field associated with the second touch-panel device; or one or more instructions for establishing a communications channel between a first electronic system associated with the first touch-panel device and a second electronic system associated with the second touch-panel device wherein the communications channel uses the first signal and the second signal. The one or more instructions may be, for example, computer executable and/or logic implemented instructions. In some embodiments, the signal bearing medium 702 of the one or more computer program products 700 include a computer-readable medium 706, a recordable medium 708, and/or a communications medium 710.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the described systems by an RF signal bearing medium 702, where the signal bearing medium 702 is conveyed by a wireless form of communications medium 710 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A touch-panel device comprising:
a processor;
a detect electrode including a touch-panel grid of capacitive electrodes; and
a controller coupled to the processor, the controller including a detection circuit coupled to the detect electrode, wherein the controller is configured to receive a first signal from the detect electrode with the detection circuit, detect a modulation in the received first signal, and determine information associated with the detected modulation, wherein the detected modulation in the first signal is indicative of a physical proximity between the touch-panel device and another touch-panel device, wherein the first signal is provided by another touch-panel grid of capacitive electrodes of the other touch-panel device.

2. The touch-panel device of claim 1, wherein the controller is further configured to detect a discovery beacon in the first signal from the determined information.

3. The touch-panel device of claim 1, further comprising a drive electrode, wherein the controller further comprises a driver circuit that is coupled to the drive electrode, wherein the driver circuit of the controller is configured to generate a second signal that is coupled to a drive electrode of the touch-panel device.

4. The touch-panel device of claim 3, wherein the controller is further configured to encode a discovery beacon in the second signal such that the discovery beacon is conveyed to the other touch-panel device via the drive electrode of the touch-panel device.

5. The touch-panel device of claim 3, wherein the controller is further configured to encode information in the second signal such that the encoded information is conveyed to the other touch-panel device via the drive electrode of the touch-panel device.

6. The touch-panel device of claim 3, wherein the controller is further configured to establish a communication channel between the touch-panel device and the other touch-panel device, wherein the drive electrode and the detect electrode of the touch-panel device operate as a respective one of a transmitter and a receiver for the communication channel.

7. The touch-panel device of claim 6, wherein the controller is further configured to share a key with the other touch-panel device using the communication channel.

8. The touch-panel device of claim 6, wherein the controller is further configured to share identification information with the other touch-panel device using the communication channel.

9. The touch-panel device of claim 8, wherein the identification information relates to sharing a peripheral device with the other touch-panel device.

10. The touch-panel device of claim 8, wherein the identification information relates to establishing a second communication channel with the other touch-panel device.

11. The touch-panel device of claim 1, further comprising a dielectric covering at least a portion of an outer surface of the touch-panel device.

12. A computer readable storage product having computer-executable instructions stored thereon for a method which, when executed by a computing device, adapt the computing device to establish communications utilizing a touch-panel device, the method comprising:
modulating information in a first signal;
coupling the first signal to a drive electrode including a touch-panel grid of capacitive electrodes of the touch-panel device such that the drive electrode generates a first electromagnetic field in response to the first signal;
receiving a second signal from a detect electrode of the touch-panel device, wherein the second signal is responsive to a second electromagnetic field provided by another touch-panel grid of capacitive electrodes of another touch-panel device; and
establishing a communications channel between the touch-panel device and the other touch-panel device using the first signal and the second signal.

13. The computer readable storage product of claim 12, wherein modulating the first signal comprises encoding the first signal with symbols, wherein the symbols are associated with one or more of a discovery beacon, data, and/or an acknowledgement.

14. The computer readable storage product of claim 12, the method further comprising exchanging a key between the touch-panel device and the other touch-panel device using the communications channel.

15. The computer readable storage product of claim 14, the method further comprising securing information exchanged between the touch-panel device and the other touch-panel device using the key.

16. The computer readable storage product of claim 14, the method further comprising authenticating information exchanged between the touch-panel device and the other touch-panel device using the key.

17. A computer-implemented method for communicating between a first touch-panel device and a second touch-panel device, the method comprising:
receiving, at the first touch-panel device, a first signal from a first electrode including a touch-panel grid of capacitive electrodes coupled to a first panel of the first touch-panel device, wherein the first signal is provided by a second touch-panel grid of capacitive electrodes of the second touch-panel device;
detecting, at the first touch-panel device, a modulation in the first signal, wherein the modulation indicates a communication from the second touch-panel device; and
determining, at the first touch-panel device, information associated with the modulation.

18. The computer-implemented method of claim 17, further comprising generating, at the first touch-panel device, a second signal to be driven to a second electrode of the first touch-panel device.

19. The computer-implemented method of claim 18, further comprising establishing a communications channel between the first touch-panel device and the second touch-panel device, wherein transmission and reception over the communications channel is facilitated via the first signal and the second signal.

20. The computer-implemented method of claim 19, further comprising sharing identification information and/or security keys over the communications channel.

* * * * *

UNITED STATES PATENT AND TRADEMARK OFFICE
CERTIFICATE OF CORRECTION

PATENT NO. : 8,643,625 B2
APPLICATION NO. : 13/142093
DATED : February 4, 2014
INVENTOR(S) : Kruglick

Page 1 of 1

It is certified that error appears in the above-identified patent and that said Letters Patent is hereby corrected as shown below:

In the Specifications

In Column 10, Line 40, delete "en coding" and insert -- encoding --, therefor.

Signed and Sealed this
Twentieth Day of May, 2014

Michelle K. Lee
*Deputy Director of the United States Patent and Trademark Office*